(12) United States Patent
Groll et al.

(10) Patent No.: US 10,081,163 B2
(45) Date of Patent: Sep. 25, 2018

(54) COOKING UTENSIL HAVING A GRAPHITE CORE

(71) Applicant: All-Clad Metalcrafters LLC, Canonsburg, PA (US)

(72) Inventors: William A. Groll, McMurray, PA (US); John Watkins, Canonsburg, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

(21) Appl. No.: 15/433,728

(22) Filed: Feb. 15, 2017

(65) Prior Publication Data
US 2017/0157895 A1    Jun. 8, 2017

Related U.S. Application Data

(63) Continuation-in-part of application No. 14/797,489, filed on Jul. 13, 2015, now Pat. No. 9,585,514, which
(Continued)

(51) Int. Cl.
*A47J 36/02* (2006.01)
*B32B 9/04* (2006.01)
(Continued)

(52) U.S. Cl.
CPC ............. *B32B 9/041* (2013.01); *A47J 36/025* (2013.01); *B23K 20/023* (2013.01); *B32B 3/266* (2013.01);
(Continued)

(58) Field of Classification Search
CPC ........ A47J 360/02; A47J 37/10; A47J 27/002; A47J 36/025; A47J 36/02; B21D 51/22;
(Continued)

(56) References Cited

U.S. PATENT DOCUMENTS 2,057,254 A    10/1936    Sommer
2,284,504 A    5/1942    Wrighton et al.
(Continued)

FOREIGN PATENT DOCUMENTS

CN          2892466       4/2007
CN       201227182 Y    4/2009
(Continued)

*Primary Examiner* — Robert J Hicks
(74) *Attorney, Agent, or Firm* — The Webb Law Firm

(57) ABSTRACT

Provided is an article of cookware and a method of making the same. The cookware has a multi-layer bonded composite wall structure having an inner metal layer and an outer metal layer, and a core layer between the inner layer and the outer layer. The core layer has at least two perforated graphite plates, each plate having a plurality of spaced-apart holes formed therethrough, and at least one intermediate metal element disposed between the at least two perforated graphite plates and extending through the plurality of spaced-apart holes of each of the at least two perforated graphite plates. The at least one intermediate metal element is metallurgically bonded to the inner layer and the outer layer at least through the plurality of spaced-apart holes.

16 Claims, 3 Drawing Sheets

Related U.S. Application Data is a continuation-in-part of application No. 14/215,287, filed on Mar. 17, 2014, now Pat. No. 9,078,539.

(60) Provisional application No. 61/787,041, filed on Mar. 15, 2013.

(51) Int. Cl.

| | | |
|---|---|---|
| *B32B 3/26* | (2006.01) | |
| *B32B 7/04* | (2006.01) | |
| *B32B 9/00* | (2006.01) | |
| *B32B 15/04* | (2006.01) | |
| *B32B 15/20* | (2006.01) | |
| *B32B 15/18* | (2006.01) | |
| *B23K 20/02* | (2006.01) | |

(52) U.S. Cl.
CPC ............. *B32B 7/045* (2013.01); *B32B 9/007* (2013.01); *B32B 15/043* (2013.01); *B32B 15/18* (2013.01); *B32B 15/20* (2013.01); *B32B 2250/05* (2013.01)

(58) Field of Classification Search
CPC ...... B65D 25/14; B23K 20/023; B23K 20/02; B32B 15/012; B32B 15/01; B32B 15/043; B32B 15/18; B32B 15/20; B32B 9/041; B32B 9/007; B32B 3/266; B32B 7/045; B32B 7/04
USPC ......... 220/573.2, 573.1, 912, 62.17; 29/447; D7/354; 428/597, 596, 66.6, 131, 137, 428/34.1; 99/422, 401, 447; 126/390.1; 72/379.4
See application file for complete search history.

(56) References Cited

U.S. PATENT DOCUMENTS

| | | | |
|---|---|---|---|
| 2,576,377 A | 11/1951 | Wochos, Jr. et al. | |
| 2,765,728 A | 10/1956 | Pearce | |
| 2,908,073 A | 10/1959 | Dulin | |
| 3,054,395 A | 9/1962 | Torino | |
| 3,496,625 A * | 2/1970 | Winter | B23K 20/04 428/611 |
| 4,029,253 A | 6/1977 | Cartossi | |
| 4,204,628 A | 5/1980 | Houston et al. | |
| 4,252,263 A | 2/1981 | Houston | |
| 4,274,901 A | 6/1981 | Elber | |
| 4,315,591 A | 2/1982 | Houston | |
| 4,385,310 A | 5/1983 | Houston | |
| 4,444,352 A | 4/1984 | Glascock, II et al. | |
| 4,541,411 A | 9/1985 | Woolf | |
| 4,752,518 A * | 6/1988 | Lohrke | C04B 38/00 264/119 |
| 4,790,292 A | 12/1988 | Kuhn | |
| 4,793,324 A | 12/1988 | Caferro | |
| 5,064,055 A | 11/1991 | Bessenbach et al. | |
| 5,193,737 A | 3/1993 | Carraher | |
| 5,439,165 A | 8/1995 | Cartossi | |
| 5,694,674 A | 12/1997 | Flammang | |
| 5,848,746 A | 12/1998 | Wagner et al. | |
| 6,082,611 A | 7/2000 | Kim | |
| 6,258,457 B1 | 7/2001 | Ottinger et al. | |
| 6,715,631 B2 | 4/2004 | Kim | |
| 6,892,781 B2 | 5/2005 | McHerron et al. | |
| 7,159,757 B2 | 1/2007 | Takahashi et al. | |
| 7,168,148 B2 | 1/2007 | Groll | |
| 7,581,669 B2 | 9/2009 | Lee | |
| 7,900,811 B1 | 3/2011 | Alman et al. | |
| 8,037,602 B2 | 10/2011 | Huang | |
| 8,806,737 B2 | 8/2014 | Huang | |
| 2002/0076565 A1 * | 6/2002 | Fairbourn | A47J 36/02 428/457 |
| 2003/0160053 A1 | 8/2003 | Kim | |
| 2004/0232211 A1 | 11/2004 | Kayser et al. | |
| 2006/0068205 A1 * | 3/2006 | Potier | B32B 3/266 428/408 |
| 2006/0107842 A1 | 5/2006 | Groll | |
| 2006/0117539 A1 | 6/2006 | Alim | |
| 2006/0289487 A1 | 12/2006 | Tarenga | |
| 2008/0083747 A1 | 4/2008 | Park | |
| 2009/0188909 A1 | 7/2009 | Jones et al. | |
| 2009/0258248 A1 | 10/2009 | Tsushima | |
| 2010/0055491 A1 | 3/2010 | Vecchio et al. | |
| 2011/0041708 A1 | 2/2011 | Groll | |
| 2012/0068414 A1 * | 3/2012 | Potier | B32B 15/20 277/312 |
| 2012/0234524 A1 * | 9/2012 | Fan | H01L 23/373 165/185 |
| 2013/0108761 A1 * | 5/2013 | Kenton | A47J 37/10 426/523 |

FOREIGN PATENT DOCUMENTS

| | | | |
|---|---|---|---|
| EP | 0966910 A1 | 12/1999 | |
| EP | 1479329 A1 | 11/2004 | |
| GB | 556065 A * | 9/1943 | ............. A47J 36/02 |
| GB | 1329979 | 9/1973 | |
| GB | 2034173 A | 6/1980 | |
| JP | 2002059505 | 2/2002 | |
| JP | 2002065469 | 3/2002 | |
| JP | 20049097 A | 1/2004 | |
| JP | 2006341272 | 12/2006 | |
| JP | 4261129 | 4/2009 | |
| WO | 8704911 A1 | 8/1987 | |
| WO | 2005018393 A1 | 3/2005 | |

\* cited by examiner

COOKING UTENSIL HAVING A GRAPHITE CORE

CROSS REFERENCE TO RELATED APPLICATIONS

This application is a continuation-in-part of and claims priority to U.S. patent application Ser. No. 14/797,489, filed Jul. 13, 2015 and entitled "Heat Zone Pan", which is a continuation-in-part of and claims priority to U.S. patent application Ser. No. 14/215,287, now issued as U.S. Pat. No. 9,078,539, filed Mar. 17, 2014 and entitled "Cookware With Selectively Bonded Layers", which in turn claims priority to U.S. Patent Application No. 61/787,041, filed Mar. 15, 2013, all of which are hereby incorporated by reference herein.

BACKGROUND OF THE INVENTION

Field of the Invention

The present invention relates to multi-ply, bonded cookware having a central area of a cooking surface that has a higher level of thermal conductivity than a distal area of the cooking surface, as well as sidewalls of the cookware. A method for making the cookware using solid state bonding is also disclosed.

Description of Related Art

It has long been known to manufacture multi-layer bonded composite cookware in which various materials are joined together to combine the desired physical properties of each of the materials into a composite. For example, the corrosion resistance of stainless steel is ideal for the cooking surface as well as for the exterior surface of cookware; however, the thermal conductivity of stainless steel is not relatively high. On the other hand, aluminum and/or copper offer much higher thermal conductivities and have been bonded to stainless steel to provide well-known composite cookware items such as pots, pans, and the like. Multi-layer bonded cookware is known in the art, as shown in a number of patents, such as, for example: U.S. Pat. Nos. 4,246,045 and 4,167,606 to Ulam; and U.S. Pat. Nos. 8,133,596 and 6,267,830 to Groll. These patents demonstrate that the manufacture of multi-layer bonded cookware comprising stainless steel outer layers bonded to central layer(s) of a higher conductivity aluminum and/or copper is well known in the art. The bonding between layers of these different materials is commonly achieved by conventional roll-bonding techniques using strips of aluminum and/or copper, roll-bonded to outer strips of stainless steel. It is known that roll-bonding between copper, aluminum, and stainless steel layers is conventional in the art of making composite cookware.

A solid state bonding technique using high static pressure and heat applied over time to make a plurality of composite blanks of, for example, a combination of stainless steel-aluminum-stainless steel in the manufactured cookware, is disclosed in U.S. Pat. No. 9,078,539 to Groll et al. There is a need in the art for producing cookware made using solid state bonding techniques for reducing the weight and improving thermal characteristics of the cookware.

SUMMARY OF THE INVENTION

In view of the existing need in the art, it would be desirable to develop new methods of producing cookware using solid state bonding techniques. It would be further desirable to provide cookware made by such methods, wherein the cookware has reduced weight and improved thermal characteristics over existing cookware made by solid state bonding techniques.

In accordance with one embodiment or aspect of the present disclosure, cookware may have a multi-layer bonded composite wall structure. The cookware may have an inner metal layer and an outer metal layer, and a core layer between the inner layer and the outer layer. The core layer may have at least two perforated graphite plates, each plate having a plurality of spaced-apart holes formed therethrough, and at least one intermediate metal element disposed between the at least two perforated graphite plates and extending through the plurality of spaced-apart holes of each of the at least two perforated graphite plates. The at least one intermediate metal element may be metallurgically bonded to the inner layer and the outer layer at least through the plurality of spaced-apart holes.

In accordance with another embodiment or aspect of the present disclosure, cookware may have a multi-layer bonded composite wall structure. The cookware may have an inner metal layer and an outer metal layer; and a core layer between the inner layer and the outer layer. The core layer may have at least two perforated graphite plates, each plate having a plurality of spaced-apart holes formed therethrough, and at least one metal core plate disposed between the at least two perforated graphite plates and extending through the plurality of spaced-apart holes of each of the at least two perforated graphite plates. The at least one metal core plate may be metallurgically bonded to the inner layer and the outer layer at least through the plurality of spaced-apart holes.

In accordance with another embodiment or aspect of the present disclosure, the at least one intermediate metal element may be an aluminum plate. The at least one intermediate metal element can be a disc having a diameter equal to or larger than the at least two perforated graphite plates. The at least one intermediate metal element may have a thickness of 0.032 in. At least one of the perforated graphite plates may have a thickness between 0.0010 in. and 0.0050 in. The inner layer may be stainless steel and have a thickness between 0.010 in. to 0.015 in. The outer layer may be stainless steel and have a thickness between 0.010 in. to 0.020 in. The inner layer and the outer layer may be circular with a diameter of 5 in. to 25 in. The at least one intermediate metal element may be a disc having a diameter of 5 in. to 25 in. At least one of the perforated graphite plates may be a disc having a diameter of 2 in. to 20 in. At least one of the perforated graphite plates may be made from pyrolytic graphite. The plurality of spaced-apart holes of at least one of the perforated graphite plates may have a diameter of 0.025 in. to 0.25 in. The at least one intermediate metal element may be metallurgically bonded to the inner metal layer and the outer metal layer in an area surrounding the at least two perforated graphite plates. The cookware may be formed as a fry pan. The cookware may have a bottom portion surrounded by a sidewall, and the at least two perforated graphite plates may be located only in the bottom portion. The at least one metal core plate may have a pair of metal core plates disposed between the at least two perforated graphite plates. The at least two perforated graphite plates may have at least one perforated graphite plate disposed between the inner metal layer and the at least one metal core plate, and at least one perforated graphite plate disposed between the metal core plate and the outer metal layer.

In accordance with another embodiment or aspect of the present disclosure, cookware may have an inner metal layer; an outer metal layer; and at least one perforated graphite plate having a plurality of spaced-apart holes formed therethrough disposed between the inner metal layer and the outer metal layer. At least one of the inner metal layer and the outer metal layer may extend through the plurality of spaced-apart holes of the at least one perforated graphite plate. The inner metal layer may be metallurgically bonded to the outer metal layer at least through the plurality of spaced-apart holes.

In accordance with another embodiment or aspect of the present disclosure, at least one of the inner metal layer and the outer metal layer may be made as an aluminum plate. At least one of the inner metal layer and the outer metal layer may have a thickness of 0.032 in. The perforated graphite plate may have a thickness between 0.0010 in. and 0.0050 in. The inner layer may be stainless steel and have a thickness between 0.010 in. to 0.015 in. The outer layer may be stainless steel and have a thickness between 0.010 in. to 0.020 in. The inner layer and the outer layer may be circular with a diameter of 5 in. to 25 in. The at least one perforated graphite plate may be a disc having a diameter of 2 in. to 20 in. The at least one perforated graphite plate may be made from pyrolytic graphite. The plurality of spaced-apart holes of the at least one perforated graphite plate may have a diameter of 0.025 in. to 0.25 in. The inner metal layer may be metallurgically bonded to the outer metal layer in an area surrounding the at least one perforated graphite plate. The cookware may be formed as a fry pan. The cookware may have a bottom portion surrounded by a sidewall, and the at least one perforated graphite plate may be located only in the bottom portion.

In accordance with another embodiment or aspect of the present disclosure, a method of making multi-layer bonded cookware may include providing an inner metal layer and an outer metal layer; providing a core layer between the inner layer and the outer layer to define a stacked blank assembly, the core layer comprising at least two perforated graphite plates, each plate having a plurality of spaced-apart holes formed therethrough, and at least one metal core plate disposed between the at least two perforated graphite plates; and applying heat and pressure to the stacked blank assembly such that the at least one metal core plate is extruded through the plurality of spaced-apart holes of each of the at least two perforated graphite plates and is metallurgically bonded to the inner layer and the outer layer at least through the plurality of spaced-apart holes.

In accordance with another embodiment or aspect of the present disclosure, a method of making multi-layer bonded cookware may include providing an inner metal layer and an outer metal layer; providing a perforated graphite plate between the inner metal layer and the outer metal layer to define a stacked blank assembly, the perforated graphite plate having a plurality of spaced-apart holes formed therethrough; and applying heat and pressure to the stacked blank assembly such that the inner metal layer is metallurgically bonded to the outer metal layer at least through the plurality of spaced-apart holes of the perforated graphite plate.

These and other features and characteristics of the cookware described herein, as well as methods of making such cookware, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWING(S)

In FIGS. 1-7, the same characters represent the same components unless otherwise indicated.

DETAILED DESCRIPTION OF THE INVENTION

Figure 1:
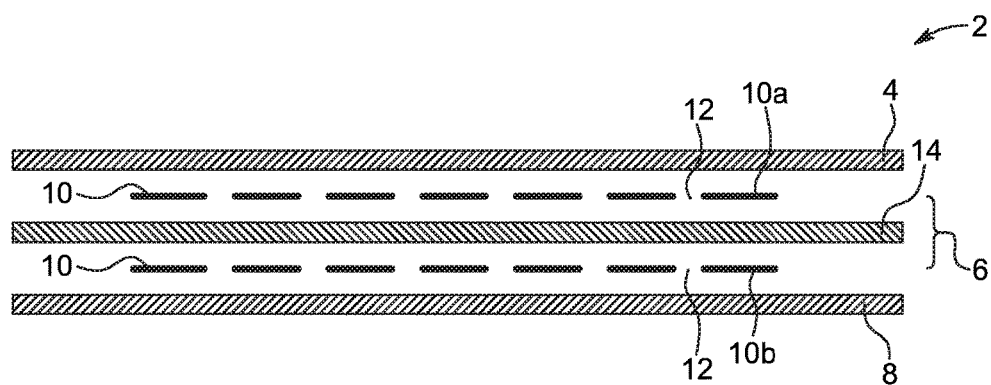
FIG. 1 is an exploded isometric view of a blank assembly of one embodiment or aspect of the present disclosure.

As used herein, the singular form of "a", "an", and "the" includes plural referents unless the context clearly dictates otherwise.

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

All documents, such as but not limited to issued patents and patent applications, referred to herein, and unless otherwise indicated, are to be considered to be "incorporated by reference" in their entirety.

As used herein, the term "solid state bonding" means a method of bonding two or more stacked plates of metals or metal alloys together using high pressure (typically over 5,000 psi) and high temperature (typically over 600° F.), wherein the high pressure is applied in a normal or axial direction, i.e., 90° relative to the plane of the stacked plates.

As used herein, the term "metallurgical bonding" or "metallurgically bonded" refers to a bond formed between similar or dissimilar materials that is free of voids or discontinuities.

Figure 2:
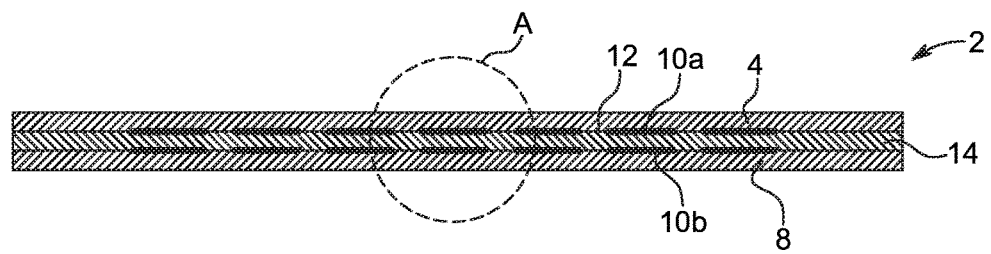
FIG. 2 is a cross-sectional view of a bonded blank assembly of FIG. 1.
Figure 3:
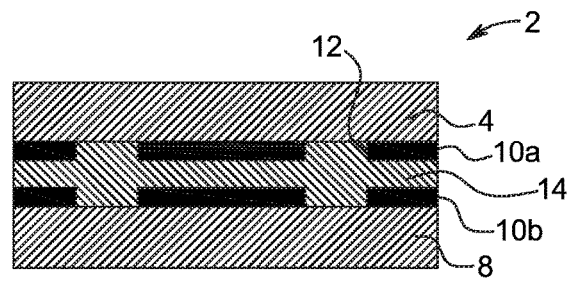
FIG. 3 is an enlarged view of Detail A shown in FIG. 2.

With reference now to the drawings, FIGS. 1-3 depict various views of a blank assembly 2 used in making one presently preferred embodiment of the cookware of the present invention. After appropriate surface preparation of the various layers of materials to be used in a bonding step, the materials are positioned in an ordered array to create the blank assembly 2 as shown. In some examples, the surface preparation steps may include degreasing, surface abrasion by chemical or mechanical methods, and the like.

The blank assembly 2 comprises upper and lower plates 4 and 8 which will form the inner and outer surfaces, respectively, of the cookware after the bonding and forming steps. In one exemplary and non-limiting embodiment, at least one of the upper and lower plates 4 and 8 is formed from metal, such as stainless steel, or titanium. In some examples, the stainless steel may be 300 grade or 400 grade stainless steel. In further examples, both the upper and lower plates 4 and 8 are formed from stainless steel. The upper and lower plates 4 and 8 may be discs about 14 inches in diameter to form a near-net size blank for making a fry pan of 10 inches in diameter. In other examples, the upper and lower plates 4 and 8 may be discs from about 5 inches to about 20 inches in diameter. In this manner, scrap losses can be minimized. One of ordinary skill in the art would readily appreciate that the size of the upper and lower plates 4 and 8 can be increased or decreased to make fry pans of larger or smaller sizes, respectively. In some examples, the thickness of upper and lower plates 4 and 8 may be about 0.015 to 0.03 inches. The lower plate 8 of stainless steel may be made of a ferro-magnetic stainless steel, such as a 400 grade in order to make the finished cookware suitable for use on an induction cooking apparatus. The upper plate 4 is a food-grade stainless steel, such as an austenitic 300 grade. In other examples, at least one of the upper and lower plates 4 and 8 may be made from food-grade metal other than stainless steel, such as titanium.

Between the upper and lower plates 4 and 8 is a central core layer 6. The central core layer 6 includes at least one perforated graphite plate 10 having a plurality of spaced-apart holes 12 and at least one intermediate metal element, such as at least one metal core plate 14. For example, as shown in FIGS. 1-3, the core layer 6 has a pair of perforated graphite plates 10, with one plate positioned on each side of a single metal core plate 14. After the solid state bonding process, the metal core plate 14 is extruded through the holes 12 of each perforated graphite plate 10 and is bonded with the upper and lower plates 4 and 8. In other examples, the core layer 6 has a pair of perforated graphite plates 10 with two or more stacked metal core plates 14 positioned between the pair of perforated graphite plates 10. Preferably, one perforated graphite plate 10 is directly between the upper plate 4 and the metal core plate(s) 14, and the other perforated graphite plate 10 is directly between the metal core plate(s) 14 and lower plate 8.

In some examples, the perforated graphite plate 10 is about 0.0010-0.0050 inches thick and has the plurality of spaced-apart through holes 12 formed therethrough. The size of the perforated graphite plate 10 is sized to be smaller than the metal core plate 14 and the upper and lower plates 4 and 8 so that an outer edge of the perforated graphite plate 10 is spaced radially inwardly from the outer edges of the metal core plate 14, and the upper and lower plates 4 and 8. For example, a diameter of the perforated graphite plate 10 may be selected to correspond to a diameter of the cooking surface of the cookware 30 such that the perforated graphite plate 10 is spaced apart from the radiused portion 32 of the formed cookware 30 (FIG. 4) in the region where a flat bottom 34 transitions to a sidewall 36. For a 10-inch fry pan, the diameter of the perforated graphite plate may be 7-9 inches, for example.

The holes 12 in the perforated graphite plate 10 may be about 0.025-0.25 inches in diameter. The holes 12 may be spaced apart from each other randomly, or in a pattern. For examples, the holes 12 may be arranged in a circular array. In various examples, the density of the holes 12 (i.e., number of holes 12 per unit area) may be uniform across the perforated graphite plate 10, or it may vary between different portions of the perforated graphite plate 10. For example, the density of the holes 12 may increase or decrease in a radial direction of the perforated graphite plate 10. In further examples, the holes 12 may be provided in one or more groupings of holes 12.

The perforated graphite plate 10 may be made of pyrolytic graphite so as to transmit thermal energy primarily in a radial (rather than axial) direction. In this manner, the cooking surface can be heated uniformly, while avoiding hot spots. Graphite is preferably selected due to its high coefficient of thermal conductivity (approximately 1,700 W/mK versus approximately 200 W/mK for aluminum).

The metal core plate 14 of the central core layer 6 encapsulates the perforated graphite plate 10 between the upper and lower plates 4 and 8 by being metallurgically bonded with the upper and lower plates 4 and 8 during the solid state bonding process. In the example shown in FIGS. 1-3, a bottom portion of the metal core plate 14 is extruded through the holes 12 of the lower perforated graphite plate 10b during the solid state bonding process and is bonded with the upper surface of the lower plate 8. An upper portion of the metal core plate 14 is extruded through the holes 12 of the upper perforated graphite plate 10a during the solid state bonding process and is bonded with the lower surface of the upper plate 4. Because the metal core plate 14 is larger in diameter than the perforated graphite plates 10a, 10b, the metal core plate 14 is bonded with the upper and lower plates 4 and 8 over an entire surface of the metal core plate 14 surrounding the perforated graphite plates 10a, 10b.

In one exemplary and non-limiting embodiment, the metal core plate 14 is formed from aluminum alloy, such as 1100 grade aluminum alloy. In other examples, the metal core plate 14 is formed from pure aluminum, aluminum clad metal, copper, or any other metal capable of metallurgically bonding with the upper and lower plates 4 and 8. The metal core plate 14 is larger than the perforated graphite plates 10a, 10b and may be sized to correspond to the size of the upper and lower plates 4 and 8. For example, the metal core plate 14 may be a disc about 14 inches in diameter to form a near-net size blank for making a fry pan of 10 inches in diameter. In other examples, the metal core plate 14 may be a disc about 2-20 inches in diameter. In this manner, scrap losses can be minimized. One of ordinary skill in the art would readily appreciate that the size of the metal core plate 14 can be increased or decreased to make fry pans of larger or smaller sizes, respectively. In some examples, the thickness of the metal core plate may be about 0.032 to 0.040 inches.

Having described the structure of the blank assembly 2 in accordance with various embodiments or aspects of the present disclosure, a method of making cookware using the blank assembly 2 will now be described. Initially, the blank assembly 2 is formed by stacking the central core layer 6 on an upper surface of the lower plate 8. In the case of the blank assembly 2 shown in FIGS. 1-3, the central core layer 6 can be stacked on the lower plate 8 by placing the lower perforated graphite plate 10b on top of the lower plate 8, followed by the metal core plate 14 and the upper perforated graphite plate 10a. The upper plate 4 is then stacked on a top surface of the upper perforated graphite plate 10a. Desirably, the upper plate 4, the central core layer 6, and the lower plate 8 are aligned such that centers of each layer share a common axis. In some examples, the layers may be stacked such that their centers are offset from one another. When stacked, the upper plate 4, the central core layer 6, and the lower plate 8 are substantially parallel to each other.

The blank assembly 2, or a plurality of stacked blank assemblies 2, are then placed in a press apparatus (not shown) for application of a load or pressure in the normal direction relative to the planes of plates in the blank assemblies 2. While under a pressure of between 10,000 and 20,000 psi, heat is applied to the blank assembly or assemblies 2 between about 800° F. and 1,400° F. for a sufficient time (about 1-2 hours) to achieve solid state bonding (i.e., metallurgical bonding) between the plates in the blank assembly or assemblies 2. During the solid state bonding process, the material of the metal core plate 14 is softened with the increase in temperature and is extruded through the holes 12 of the perforated graphite plates 10*a*, 10*b* to be metallurgically bonded with the upper and lower plates 4 and 8. Good bonding between stainless steel and aluminum is obtained at a pressure of 20,000 psi at a temperature of 860° F. after about one hour.

Each blank assembly 2 is then removed from the press apparatus and allowed to cool. In some examples, cooling may be accomplished by exposure to ambient air or by using a cooling agent, such as forced air or liquid.

Figure 4:
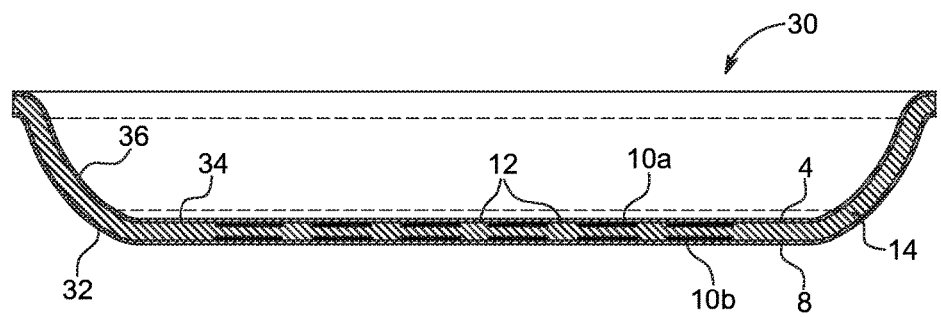
FIG. 4 is a cross-sectional view of a formed fry pan shape made from the bonded blank assembly of FIG. 2.

After solid state bonding, the bonded blank assembly 2 is formed in a drawing press or hydroform machine (not shown) into a desired shape, such as a fry pan shape 30 depicted in FIG. 4. It will be seen in FIG. 4 that the metal core layer 14 is extruded through the holes 12 in the perforated graphite plates 10*a*, 10*b* and is bonded to the upper and lower plates 4 and 8. The metal core layer 14 is further bonded to the upper and lower plates 4 and 8 in an area surrounding the perforated graphite plates 10*a*, 10*b*, such as in the area defining the sidewall 36 of the fry pan 30. A handle or handles (not shown) may be attached to the cookware in a known manner.

Figure 5:
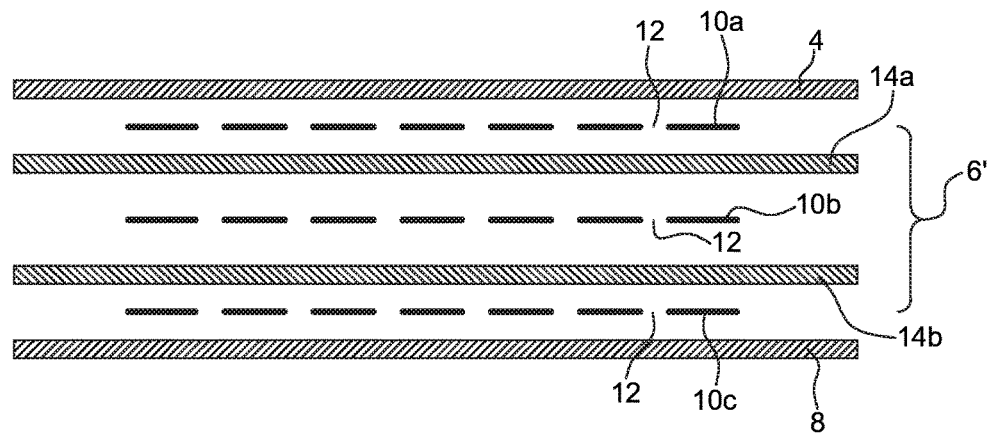
FIG. 5 is an exploded side view of a blank assembly of another embodiment or aspect of the present disclosure.
Figure 6:
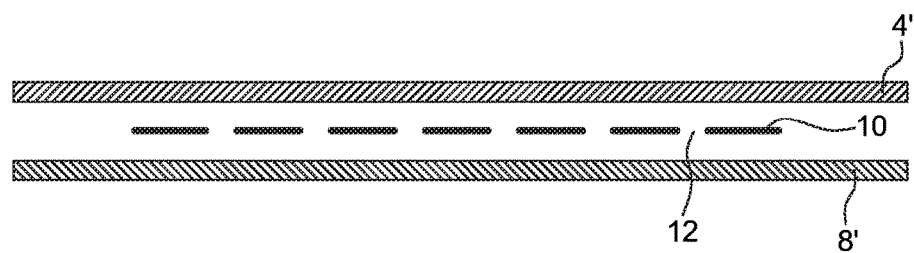
FIG. 6 is an exploded side view of a blank assembly of another embodiment or aspect of the present disclosure.
Figure 7:
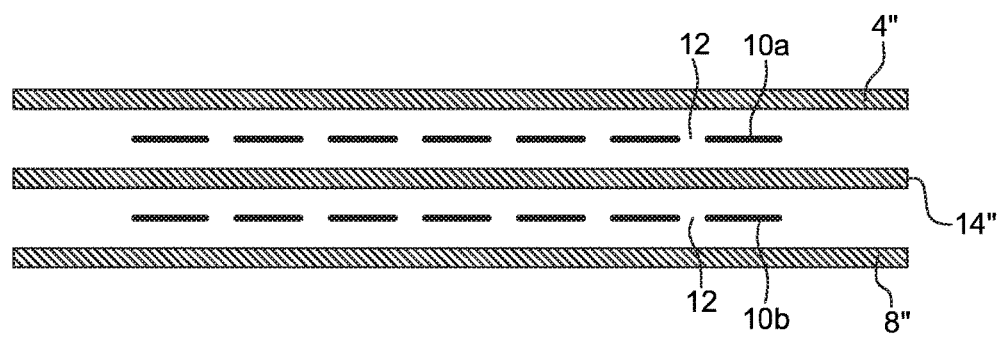
FIG. 7 is an exploded side view of a blank assembly of another embodiment or aspect of the present disclosure.

With reference to FIGS. 5-7, blank assemblies 2, useful in making cookware, are shown in accordance with other preferred and non-limiting embodiments or aspects of the present disclosure. The components of the blank assemblies 2 shown in FIGS. 5-7 are substantially similar or identical to the components of the blank assembly 2 described herein with reference to FIGS. 1-3. As the previous discussion regarding the blank assembly 2 generally shown in FIGS. 1-3 is applicable to the embodiments shown in FIGS. 5-7, only the relative differences between the blank assembly 2 generally shown in FIGS. 1-3 and the blank assemblies shown in FIGS. 5-7 are discussed hereinafter.

With reference to FIG. 5, the blank assembly 2 comprises upper and lower plates 4 and 8 which will form the inner and outer surfaces, respectively, of the cookware after the bonding and forming steps. Between the upper and lower plates 4 and 8 is a central core layer 6'. The central core layer 6' includes three perforated graphite plates 10*a*, 10*b*, and 10*c*, and a pair of metal core plates 14*a*, 14*b* disposed between the perforated graphite plates 10*a*, 10*b*, and 10*c*. Each of the perforated graphite plates 10*a*, 10*b*, 10*c* has a plurality of spaced-apart holes 12. After the solid state bonding process, the upper surface of the upper metal core plate 14*a* and the lower surface of the lower metal core plate 10*b* are extruded through the holes 12 of the first and third perforated graphite plates 10*a*, 10*c*, respectively, and are metallurgically bonded with the upper and lower plates 4 and 8, respectively. The lower surface of the upper metal core plate 14*a* and the upper surface of the lower metal core plate 14*b* are extruded through the holes 12 of the intermediate perforated graphite plate 10*b* and are metallurgically bonded with each other. The upper and lower metal core plates 14 are further bonded to the upper and lower plates 4 and 8 in an area surrounding the perforated graphite plates 10*a*, 10*b*, and 10*c*.

With reference to FIG. 6, the blank assembly 2 does not have a core layer, such as the core layer 6 shown in FIGS. 1-3 or the core layer 6' shown in FIG. 5. Instead, the blank assembly 2 has an upper plate 4' made from a first material, such as stainless steel, and a lower plate 8' made from a second material, such as aluminum. The perforated graphite plate 10 having a plurality of holes 12, as described herein, is disposed between the upper and lower plates 4' and 8'. In some examples, a plurality of perforated graphite plates 10 may be stacked between the upper and lower plates 4' and 8'. After the solid state bonding process, the upper surface of the lower plate 8' is extruded through the holes 12 of the perforated graphite plate(s) 10 and is metallurgically bonded with the lower surface of the upper plate 4'. The upper and lower plates 4' and 8' are further metallurgically bonded with each other in an area surrounding the perforated graphite plate 10.

With reference to FIG. 7, the upper plate 4", the lower plate 8", and the metal core plate 14" are all made from the same material, such as aluminum. A pair of perforated graphite plates 10*a*, 10*b*, as described herein, are disposed between the upper plate 4", the lower plate 8", and the metal core plate 14". In some examples, a plurality of perforated graphite plates 10*a* may be stacked directly on one another between the upper plate 4" and the metal core plate 14", and/or a plurality of graphite plates 10*b* may be stacked directly on one another between the metal core plate 14" and the lower plate 8". After the solid state bonding process, the lower surface of the upper plate 4" and/or the upper surface of the metal core plate 14" are extruded though the holes of the upper perforated graphite plate 10*a* and are metallurgically bonded together. At the same time, the upper surface of the lower plate 8" and/or the lower surface of the metal core plate 14" are extruded through the holes of the lower perforated graphite plate 10*b* and are metallurgically bonded together. The upper and lower plates 4" and 8" are further metallurgically bonded with the metal core plate 14" in an area surrounding the perforated graphite plates 10*a*, 10*b*.

The solid state bonding technique of bonding pre-cut near net shape plate blanks not only reduces scrap losses heretofore encountered in the conventional roll bonding manufacture of composite cookware but also permits the use of other materials in making multiple composites which have proven difficult, impossible and/or expensive to roll-bond. For example, solid state bonding permits the use of different grades of stainless steel than otherwise possible in conventional roll bonding so as to lower costs of materials. Furthermore, solid state bonding further allows encapsulating of materials, such as graphite, that cannot otherwise be bonded to stainless steel.

In various examples, the present invention may be further characterized by one or more of the following clauses:

Clause 1. Cookware having a multi-layer bonded composite wall structure, the cookware comprising:

an inner metal layer and an outer metal layer; and a core layer between the inner layer and the outer layer, the core layer comprising at least two perforated graphite plates, each of said at least two perforated graphite plates having a plurality of spaced-apart holes formed therethrough, and at least one metal core plate disposed between the at least two perforated graphite plates and extending through the plurality of spaced-apart holes of each of the at least two perforated graphite plates, wherein the at least one metal core plate is metallurgically bonded to the inner layer and the outer layer at least through the plurality of spaced-apart holes.

Clause 2. The cookware of clause 1, wherein the at least one metal core plate is an aluminum plate.

Clause 3. The cookware of any of clauses 1-2, wherein the at least one metal core plate has a thickness of 0.032 in.

Clause 4. The cookware of any of clauses 1-3, wherein at least one of the perforated graphite plates has a thickness between 0.0010 in. and 0.0050 in.

Clause 5. The cookware of any of clauses 1-4, wherein the inner layer is stainless steel and has a thickness between 0.010 in. to 0.015 in.

Clause 6. The cookware of any of clauses 1-5, wherein the outer layer is stainless steel and has a thickness between 0.010 in. to 0.020 in.

Clause 7. The cookware of any of clauses 1-6, wherein the inner layer and the outer layer are circular with a diameter of 5 in. to 25 in.

Clause 8. The cookware of any of clauses 1-7, wherein at least one metal core plate has a diameter of 5 in. to 25 in.

Clause 9. The cookware of any of clauses 1-8, wherein at least one of the perforated graphite plates has a diameter of 2 in. to 20 in.

Clause 10. The cookware of any of clauses 1-9, wherein at least one of the perforated graphite plates is made from pyrolytic graphite.

Clause 11. The cookware of any of clauses 1-10, wherein the plurality of spaced-apart holes of at least one of the perforated graphite plates have a diameter of 0.025 in. to 0.25 in.

Clause 12. The cookware of any of clauses 1-11, wherein the at least one metal core plate is metallurgically bonded to the inner layer and the outer layer in an area surrounding the at least two perforated graphite plates.

Clause 13. The cookware of any of clauses 1-12, wherein the cookware is formed as a fry pan.

Clause 14. The cookware of any clauses 1-13, wherein the cookware comprises a bottom portion surrounded by a sidewall, and wherein the at least two perforated graphite plates are located only in the bottom portion.

Clause 15. Cookware having a multi-layer bonded composite wall structure, the cookware comprising: an inner metal layer; an outer metal layer; and at least one perforated graphite plate having a plurality of spaced-apart holes formed therethrough disposed between the inner metal layer and the outer metal layer, at least one of the inner metal layer and the outer metal layer extending through the plurality of spaced-apart holes of the at least one perforated graphite plate, wherein the inner metal layer is metallurgically bonded to the outer metal layer at least through the plurality of spaced-apart holes.

Clause 16. The cookware of clause 15, wherein at least one of the inner metal layer and the outer metal layer is made as an aluminum plate.

Clause 17. The cookware of clause 15 or clause 16, wherein at least one of the inner metal layer and the outer metal layer has a thickness of 0.032 in.

Clause 18. The cookware of one of clauses 15-17, wherein the at least one perforated graphite plate has a thickness between 0.0010 in. and 0.0050 in.

Clause 19. The cookware of one of clauses 15-18, wherein the inner layer is stainless steel and has a thickness between 0.010 in. to 0.015 in.

Clause 20. The cookware of one of clauses 15-19, wherein the outer layer is stainless steel and has a thickness between 0.010 in. to 0.020 in.

Clause 21. The cookware of one of clauses 15-20, wherein the inner layer and the outer layer are circular with a diameter of 5 in. to 25 in.

Clause 22. The cookware of one of clauses 15-21, wherein the at least one perforated graphite plate has a diameter of 2 in. to 20 in.

Clause 23. The cookware of one of clauses 15-22, wherein the at least one perforated graphite plate is made from pyrolytic graphite.

Clause 24. The cookware of one of clauses 15-23, wherein the plurality of spaced-apart holes of the at least one perforated graphite plate have a diameter of 0.025 in. to 0.25 in.

Clause 25. The cookware of one of clauses 15-24, wherein the inner metal layer is metallurgically bonded to the outer metal layer in an area surrounding the at least one perforated graphite plate.

Clause 26. The cookware of one of clauses 15-25, wherein the cookware is formed as a fry pan.

Clause 27. The cookware of one of clauses 15-26, wherein the cookware comprises a bottom portion surrounded by a sidewall, and wherein the at least one perforated graphite plate is located only in the bottom portion.

Clause 28. A method of making multi-layer bonded cookware, the method comprising: providing an inner metal layer and an outer metal layer; providing a core layer between the inner layer and the outer layer to define a stacked blank assembly, the core layer comprising at least two perforated graphite plates, each plate having a plurality of spaced-apart holes formed therethrough, and at least one metal core plate disposed between the at least two perforated graphite plates; and applying heat and pressure to the stacked blank assembly such that the at least one metal core plate is extruded through the plurality of spaced-apart holes of each of the at least two perforated graphite plates and is metallurgically bonded to the inner layer and the outer layer at least through the plurality of spaced-apart holes.

Clause 29. A method of making multi-layer bonded cookware, the method comprising: providing an inner metal layer and an outer metal layer; providing a perforated graphite plate between the inner metal layer and the outer metal layer to define a stacked blank assembly, the perforated graphite plate having a plurality of spaced-apart holes formed therethrough; and applying heat and pressure to the stacked blank assembly such that the inner metal layer is metallurgically bonded to the outer metal layer at least through the plurality of spaced-apart holes of the perforated graphite plate.

Clause 30. The cookware of any of clauses 1-14, wherein the at least one metal core plate is a pair of metal core plates disposed between the at least two perforated graphite plates.

Clause 31. The cookware of any of clauses 1-14 and 30, wherein the at least two perforated graphite plates comprises at least one perforated graphite plate disposed between the inner metal layer and the at least one metal core plate, and at least one perforated graphite plate disposed between the metal core plate and the outer metal layer.

The present invention has been described with reference to specific details of particular examples thereof. It is not intended that such details be regarded as limitations upon the scope of the invention except insofar as and to the extent that they are included in the accompanying claims.

The invention claimed is:

1. Cookware having a multi-layer bonded composite wall structure, the cookware comprising:

an inner metal layer and an outer metal layer; and a core layer between the inner layer and the outer layer, the core layer comprising at least two perforated graphite plates, each plate having a plurality of spaced-apart holes formed therethrough, and at least one intermediate metal element disposed between the at least two perforated graphite plates and extending through the plurality of spaced-apart holes of each of the at least two perforated graphite plates, wherein the at least one intermediate metal element is metallurgically bonded to the inner layer and the outer layer at least through the plurality of spaced-apart holes.

2. The cookware of claim 1, wherein the at least one intermediate metal element is an aluminum plate having a diameter equal to or larger than a diameter of the at least two perforated graphite plates.

3. The cookware of claim 1, wherein the at least one intermediate metal element has a thickness of 0.032 in.

4. The cookware of claim 1, wherein at least one of the perforated graphite plate s has a thickness between 0.0010 in. and 0.0050 in.

5. The cookware of claim 1, wherein the inner layer is stainless steel and has a thickness between 0.010 in. to 0.015 in.

6. The cookware of claim 1, wherein the outer layer is stainless steel and has a thickness between 0.010 in. to 0.020 in.

7. The cookware of claim 1, wherein the inner layer and the outer layer are circular with a diameter of 5 in. to 25 in.

8. The cookware of claim 2, wherein the at least one intermediate metal element has a diameter of 5 in. to 25 in.

9. The cookware of claim 1, wherein at least one of the perforated graphite plate s has a diameter of 2 in. to 20 in.

10. The cookware of claim 1, wherein at least one of the perforated graphite plates is made from pyrolytic graphite.

11. The cookware of claim 1, wherein the plurality of spaced-apart holes of at least one of the perforated graphite plates have a diameter of 0.025 in. to 0.25 in.

12. The cookware of claim 1, wherein the at least one intermediate metal element is metallurgically bonded to the inner metal layer and the outer metal layer in an area surrounding the at least two perforated graphite plates.

13. The cookware of claim 1, wherein the cookware is formed as a fry pan.

14. The cookware of claim 1, wherein the cookware comprises a bottom portion surrounded by a sidewall, and wherein the at least two perforated graphite plates are located only in the bottom portion.

15. A method of making multi-layer bonded cookware, the method comprising:
   providing an inner metal layer and an outer metal layer;
   providing a core layer between the inner layer and the outer layer to define a stacked blank assembly, the core layer comprising at least two perforated graphite plates, each plate having a plurality of spaced-apart holes formed therethrough, and at least one metal core plate disposed between the at least two perforated graphite plates; and
   applying heat and pressure to the stacked blank assembly such that the at least one metal core plate is extruded through the plurality of spaced-apart holes of each of the at least two perforated graphite plate s and is metallurgically bonded to the inner layer and the outer layer at least through the plurality of spaced-apart holes.

16. The cookware of claim 1, wherein at least one of the inner metal layer and outer metal layer is titanium.

* * * * *

UNITED STATES PATENT AND TRADEMARK OFFICE
CERTIFICATE OF CORRECTION

PATENT NO. : 10,081,163 B2  
APPLICATION NO. : 15/433728  
DATED : September 25, 2018  
INVENTOR(S) : William A. Groll et al.

Page 1 of 1

It is certified that error appears in the above-identified patent and that said Letters Patent is hereby corrected as shown below:

In the Claims

Column 11, Line 12, Claim 4, delete "plate s" and insert -- plates --

Column 11, Line 25, Claim 9, delete "plate s" and insert -- plates --

Column 12, Line 24, Claim 15, delete "plate s" and insert -- plates --

Signed and Sealed this  
First Day of January, 2019

Andrei Iancu  
*Director of the United States Patent and Trademark Office*